(12) United States Patent
Frazer

(10) Patent No.: US 8,713,189 B2
(45) Date of Patent: Apr. 29, 2014

(54) SYSTEM AND METHOD FOR RELIABLE PACKET DATA TRANSPORT IN A COMPUTER NETWORK

(75) Inventor: Mark Frazer, Toronto (CA)

(73) Assignee: Wi-Lan, Inc., Ottawa (CA)

(*) Notice: Subject to any disclaimer, the term of this patent is extended or adjusted under 35 U.S.C. 154(b) by 1641 days.

(21) Appl. No.: 10/520,949

(22) PCT Filed: Jul. 15, 2003

(86) PCT No.: PCT/CA03/01000
§ 371 (c)(1),
(2), (4) Date: Dec. 6, 2005

(87) PCT Pub. No.: WO2004/008709
PCT Pub. Date: Jan. 22, 2004

(65) Prior Publication Data
US 2006/0168262 A1    Jul. 27, 2006

(30) Foreign Application Priority Data
Jul. 15, 2002  (CA) ...................................... 2393502

(51) Int. Cl.
*G06F 15/16* (2006.01)
*H04L 29/06* (2006.01)
*H04L 29/08* (2006.01)

(52) U.S. Cl.
CPC .......... *H04L 29/06* (2013.01); *H04L 29/06095* (2013.01); *H04L 29/06102* (2013.01); *H04L 29/08081* (2013.01); *H04L 29/08009* (2013.01)
USPC ............ 709/230; 709/203; 709/236; 709/237

(58) Field of Classification Search
CPC ................................ H04L 29/06; H04L 29/08
USPC ................................... 709/227–237, 201–203
See application file for complete search history.

(56) References Cited

U.S. PATENT DOCUMENTS

| | | | | |
|---|---|---|---|---|
| 5,546,584 A | * | 8/1996 | Lundin et al. | 719/315 |
| 5,835,904 A | * | 11/1998 | Vicik et al. | 1/1 |
| 6,181,700 B1 | * | 1/2001 | Doi | 370/395.2 |
| 6,273,622 B1 | * | 8/2001 | Ben-David | 709/230 |

(Continued)

FOREIGN PATENT DOCUMENTS

DE    100 35 368 A    2/2002

OTHER PUBLICATIONS

Pantaleo M: "draft-ietf-megaco-h248v2-01.txt: The MEGACO/H. 248 Gateway Control Protocol, version 2, Annex D: Transport over IP" IETF Internet Draft, 'Online! Feb. 2002, pp. 145-150, XP002259522 Retrieved from the Internet: <URL:www.watersprings.org> retrieved on Oct. 28, 2003.

(Continued)

*Primary Examiner* — Tae Kim
(74) *Attorney, Agent, or Firm* — Procopio, Cory, Hargreaves & Savitch LLP

(57) ABSTRACT

A system and method for reliably transmitting a request from a client application (50) running on a client system (13) to a server application (52) running on a server system (15) and receiving a reply to the request, in which functions that provide parameters governing the reliable transport mechanism and message forming and parsing services are provided by the application processes to and called from application-layer protocol stacks (58, 60).

53 Claims, 9 Drawing Sheets

(56) References Cited

U.S. PATENT DOCUMENTS

| | | | |
|---|---|---|---|
| 6,345,301 B1* | 2/2002 | Burns et al. | 709/230 |
| 6,374,299 B1* | 4/2002 | Ford et al. | 709/227 |
| 6,480,507 B1* | 11/2002 | Mercer et al. | 370/469 |
| 6,546,425 B1* | 4/2003 | Hanson et al. | 709/227 |
| 7,143,131 B1* | 11/2006 | Soles et al. | 709/203 |
| 7,305,486 B2* | 12/2007 | Ghose et al. | 709/232 |
| 7,444,432 B2* | 10/2008 | Masputra et al. | 709/250 |
| 7,483,997 B2* | 1/2009 | Yagiu | 709/237 |
| 7,664,871 B2* | 2/2010 | del Val et al. | 709/231 |
| 7,899,925 B2* | 3/2011 | Ghose et al. | 709/232 |
| 8,018,929 B2* | 9/2011 | Soles et al. | 370/389 |
| 2001/0018711 A1* | 8/2001 | Morris | 709/229 |
| 2001/0032254 A1* | 10/2001 | Hawkins | 709/219 |

OTHER PUBLICATIONS

Eberhardt R et al: "Communication application programming interfaces with quality of service support" 1998 1ST. IEEE International Conference on ATM. ICATM'98. Conference Proceedings. Colmar, France, Jun. 22-24, 1998, IEEE International Conference on ATM, New York, NY: IEEE, US, Jun. 22, 1998, pp. 311-318, XP010291033 ISBN: 0-7803-4982-2.

Diot C, Chrisment I, Richards A: "Application Level Framing and Automated Implementation" Internet Citation, 'Online! 1995, pp. 1-16, XP002259523 Retrieved from the Internet: <URL: http://citeseer.nj.nec.com/diot95applicatlon.html> retrieved on Oct. 28, 2003.

International Search Report for International Application No. PCT/CA 03/01000, published Nov. 20, 2003.

* cited by examiner

SYSTEM AND METHOD FOR RELIABLE PACKET DATA TRANSPORT IN A COMPUTER NETWORK

This application is a National Stage of Application No. PCT/CA2003/001000, filed Jul. 15, 2003, which claims priority to CA 2,393,502, filed Jul. 15, 2002, the entire contents of which is incorporated by reference herein.

FIELD OF THE INVENTION

The present invention relates to systems and methods for providing for reliable transport of messages over computer networks. More specifically, the present invention relates to a system and method for providing reliable transport of messages over a computer network that includes an unreliable data link such as a wireless link in a wireless network.

BACKGROUND OF THE INVENTION

To understand the context of the present invention it may be helpful to the reader to have a concrete, but very simple exemplary computer network, such as that shown in FIG. 1 and indicated generally by reference numeral 10, to which the reader can refer. The computer network 10 is shown as including two host computers that are referred to here as client host computer 12 and server host computer 14. Those skilled in the art will understand that the designation of a host computer as a client or as a server in this context depends upon which host computer sent a request to begin an exchange of messages between the host computers 12, 14. For the purposes of this discussion it is assumed that the client host computer 12 is running a client-side network application that needs to have some processing done by a server-side network application running on the server host computer 14. Generally, the client host computer 12 will include a central processing unit ("CPU") 16 and memory 18. The CPU 16 runs the operating system 20 of the client host computer 12. In addition, the CPU 16 may run client-side network applications. The client host computer 12 interfaces with a communications network 22 through a communications interface 24. The communications network 22 may be a wired network or a wireless network or a partially wireless network and transports data between the host computers 12, 14. The communications interface 24 may be a modem or other means for interfacing between a computer and communications network 22.

Likewise, the server host computer 14 includes a CPU 26, memory 28 and an operating system 30. CPU 26 runs the operating system 30 of the server host computer 14 as well as server-side network applications. In addition, the server host computer 14 interfaces with the communications network 22 through a communications interface 32.

The elements of a simple computer network described above are known to those of ordinary skill in the art and will not be described further herein.

A client-side network application must rely on the computer network's transport system to communicate requests (sometimes referred to as "remote procedure calls" or "RPCs") to a server-side network application. Typically, a software interface, usually referred to as a "socket", is provided by an operating system 20, 30 for a network application to gain access to the transport system. On the client side, a socket is provided into which a client application can send requests to be transported to the server application. Similarly, on the server side, a socket is provided from which the server application can receive requests sent by the client application and into which the server application can send replies that need to be transported to the client application. Typically, if the computer network's transportation system is based upon the Internet Protocol ("IP"), network applications that need reliable transport use either the Transmission Control Protocol ("TCP") or include their own procedures to provide reliable transport using the User Datagram Protocol ("UDP"). In the latter case, this means that each time a network application is written for or ported to a new network configuration, significant effort is generally required to provide optimal reliable transport.

For example, a client application may need to send requests to a server application through a transport system that includes a wireless link. The transport system may have a high degree of error correction built in and may include a dedicated channel for some requests that the client applications may wish to send to some server applications. In such a situation, the reliable transport mechanisms built into TCP are not optimal for requests transmitted to all server applications over the wireless link. Because lost requests are very likely to be due to data loss in the wireless link rather than collisions or buffer overflow due to congestion, for urgent requests (e.g., for signaling that a user has picked up a telephone handset in an voice over Internet application) that will pass through the wireless link it may be preferable to retransmit an apparently lost request with a relatively long (in computer terms), but constant, delay between retransmissions and with a small hard limit on the number of retransmissions before an error is reported. However, for requests that do not pass through the wireless link or are less urgent, but which must be delivered, it may be preferable to have an initially shorter delay between retransmissions, a retransmission delay that increases linearly, and a very large number of retransmissions before an error is reported. In other cases, a protocol that handles retransmission in the manner in which TCP handles retransmissions may be desirable. Moreover, conditions in the network may change with interference in the wireless link or loading of the wire-line portion of the network, even if the network is dedicated to the network application (i.e., is not a public network like the Internet) and the radio spectrum used for the wireless is dedicated to the network.

Implementing a network application that can reliably handle remote procedure calls has in the past been done by either living with the limitations of TCP or building reliable transport into the network application and using UDP. For example, application-layer protocols such as Media Gateway Control Protocol ("MGCP") or Session Initiation Protocol ("SIP") include specifications for reliable transport that can be implemented in network applications that use remote procedure calls for signaling so that the network application itself provides reliable data transport. However, doing this adds additional complexity to the network application and means that the network application must be modified or at least tuned whenever changes occur in the network such that remote procedure calls are transported over paths having new characteristics or whenever remote procedure calls are to be made that have different requirements for timing and reliability. It would be preferable if characteristics of reliable transport mechanism provided for a specific client application that must make remote procedure calls to a specific server application could be changed without modifying the application.

For example, in Voice-Over-Internet-Protocol ("VOIP") applications, TCP and UDP are not optimal if a wireless link is involved. Such applications, if they are to provide carrier-grade voice communication, need to reliably establish a communication channel as soon as possible after a subscriber picks up a telephone handset. While such applications can tolerate some degree of media data loss in the digitized voice signal once a connection is established, signaling messages must be highly reliable if subscriber expectations raised by past experience with the Public Switched Telephone Network ("PSTN") are to be satisfied. Network applications such as VOIP applications are typically implemented in accordance with application-layer protocols such as MGCP and SIP in which reliable transport aspects are intermingled with the application-specific aspects of the protocol. Such applications directly use the services of a transport layer that implements the UDP or possibly the TCP over an IP network.

There is a need for a method and system that provides an application layer that can be adapted or adapt itself to network applications and transport conditions without revising the underlying code in either the network application or the transport layer.

SUMMARY OF THE INVENTION

The inventor, in considering how the task that a network applications programmer faces in writing or porting applications to a new network operating system could be simplified without sacrificing flexibility, concluded it would be preferable to separate as much as possible of the reliable transport mechanism from the network application while retaining UDP as an underlying transport layer. One way to accomplish simplification for the programmer is that typified by TCP; in TCP the reliable transport mechanism is built into the transport layer with little that the application programmer can do to change its characteristics to suit network conditions.

Although a new transport layer protocol to replace TCP might be an answer, the inventor realized that to make the reliable transport mechanism flexible (in way that TCP is not), it would be preferable to provide the programmer with a plurality of reliable transport "personalities". While such personalities could be built into a transport layer protocol supplanting TCP, the inventor considered that it would be preferable to split the reliable transport mechanism into (1) a new application-layer protocol stack that would provide sockets to the application and use the services provided by UDP and (2) a set of personality functions that would be compiled and linked with the application, but called by the new protocol stack to perform reliable transport-related tasks. Each set of functions would constitute one discrete personality of the reliable transport mechanism.

An application programmer in writing a network application would make calls to the new protocol stack when opening a socket and sending and receiving data. The calls that the application would make would be the same regardless of the personality selected, so that the application programmer could change the desired personality by simply re-linking the application with a different set of personality functions. The application, when opening a socket, would simply provide the new protocol stack with a set of pointers to the functions for the desired personality. Alternatively, more than one set of compiled personality functions might be linked to the application and an application might then open sockets with sets of pointers to different sets of functions for communication with different server applications.

The new protocol stack, in providing reliable transport, calls the personality functions where necessary to determine parameters needed for providing reliable transport. The personality functions provide the reliable transport protocol with flexibility. For example, if no reply is received to a request, a personality function might be called and return the timeout interval that the new protocol stack should wait before retransmitting a message. The function could calculate a time based by various back-off strategies, it could return a predetermined timeout interval, or it could adaptively calculate a timeout interval based upon current conditions.

An application programmer would be provided with the new protocol stack, the specifications for making calls to the protocol stack, and a library of sets of personality functions. The application programmer could select one or more sets of personality functions to use or could, if necessary, write a custom set of personality functions for use with the network application.

As currently implemented, the personality functions are generally used by the new protocol stack to (1) parse messages received from the transport layer, (2) add headers or trailers to requests or replies to form messages for the protocol stack to send to the transport layer, and (3) provide retransmit and reply cache timer intervals for use by the new protocol stack. For example, the following are done by the personality functions in one embodiment of the invention:
  setting up a connection;
  wrapping a payload (the request or reply provided to the stack by the application process) in a header to form a message to be sent to the transport layer;
  determining a time-out interval for the i-th retransmission of a message;
  determining a total timeout interval allowed for all retransmissions of a message; and
  parsing the messages received from the transport layer to determine the type of message (request, reply, provisional reply, or acknowledgement) for the stack.

Generally, personality functions could be used to determine any parameter of a reliable transport mechanism, handle creation and parsing of headers, and modify the data being transported. For transmissions sent between network applications that expect data to be encoded differently, personality functions could modify the payload or add additional data to the message.

Three examples of personalities are:
  a personality for over-the-air requests that provides frequent retransmissions with a hard limit on how many retransmissions are made before an error is reported;
  a personality for over-the-backhaul requests that provides exponential back-off assuming that losses could be due to congestion; and
  a personality for billing requests that provides retransmissions for a very long time before giving up.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
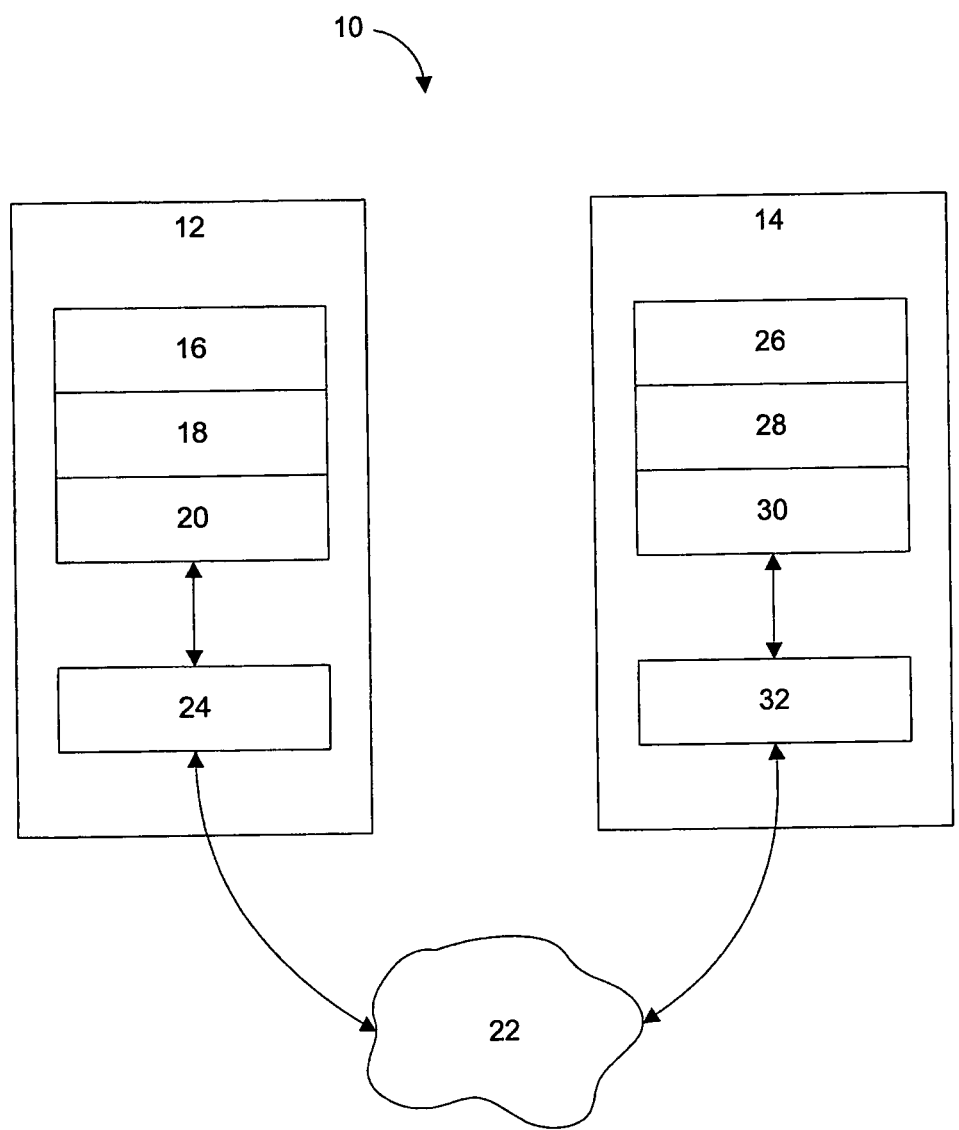
FIG. 1 is a schematic diagram of the structure of a conventional, but minimal exemplary computer network.
Figure 2:
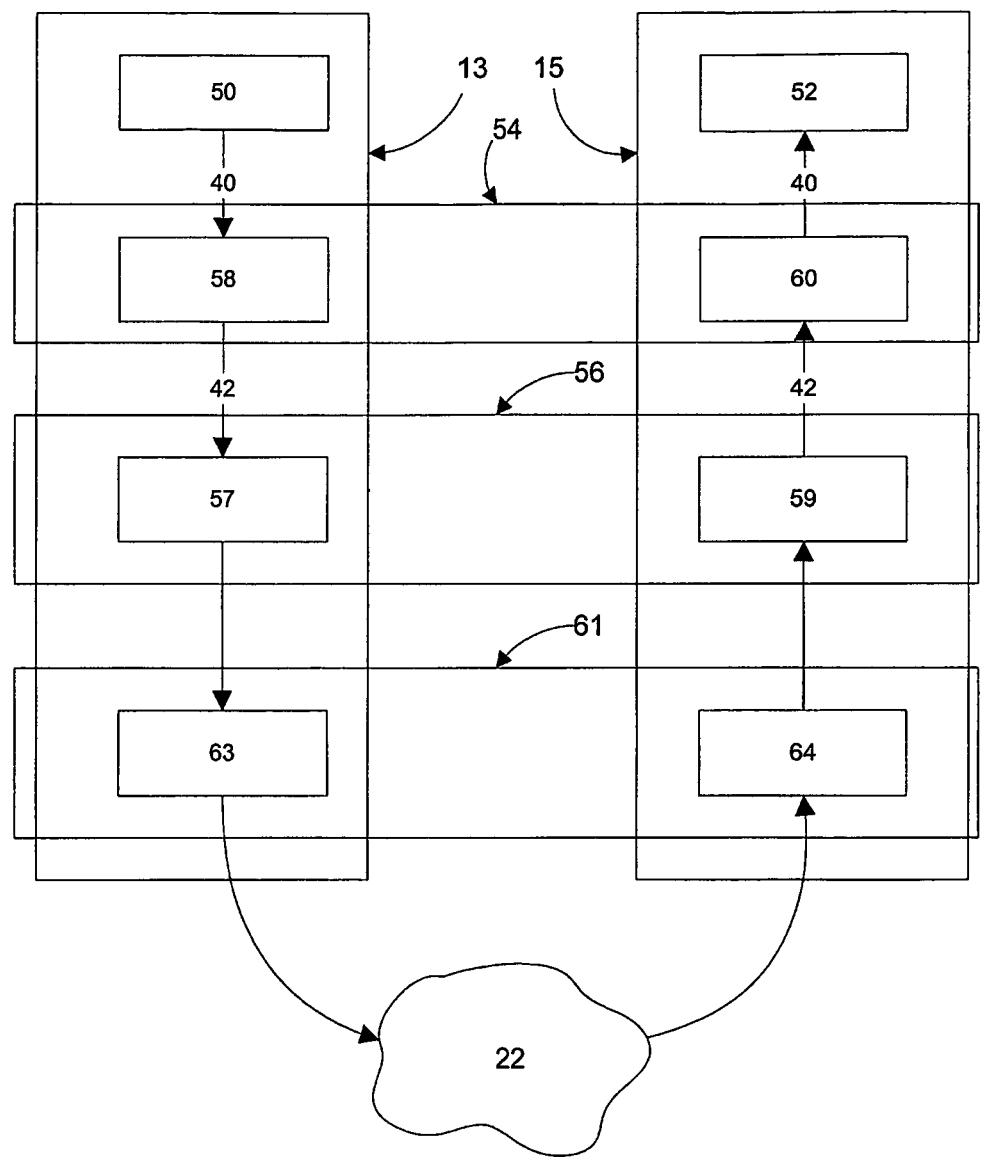
FIG. 2 is a schematic diagram of the protocol layer structure of a computer network implementing the inventive method.

FIG. 2 illustrates at a method for providing reliable transport in a computer network that is an embodiment of the invention. A request 40 is transported from a client application 50 running on a client host computer such as the client host computer 12 shown in FIG. 1 to a server application 52 running on a server host computer such as the server host computer 14. A reply by the server application 52 would be transported along the same path in the opposite direction. The boxes labeled 13 and 15 indicate client-side and server-side processes that take place in the client host computer 12 and the server host computer 14, respectively. The client application 50 is shown as a process block enclosed within the client-side processes 13 and the server application 52 is shown as a process block enclosed within server-side processes 14.

Below the blocks in FIG. 2 representing the client application 50 and the server application 52 are two rectangular boxes each overlapping both boxes 13 and 15, but not each other, labeled with reference numerals 54 and 56. These boxes indicate two of the protocol layers into which the client-side processes 13 and server-side processes 14 may be conceptually divided. Each protocol layer may be considered to provide a service to the protocol layer (or application) above it such that data submitted by an upper protocol layer (or application) to a lower protocol layer in the client host computer 12, barring losses and data corruption, will be delivered by the same lower protocol layer in the server host computer 14 to the same upper protocol layer (or application) in the server host computer 14. Rectangular box 54 represents an application protocol layer and is shown above rectangular box 56, which represents a transport protocol layer. The protocol layers below the transport protocol layer 56 are shown in FIG. 2 as a third rectangular box 61. Those lower layers receive data in protocol units generally referred to as "segments" from the client-side transport protocol layer 56 and deliver those segments to the server-side transport protocol layer 56. Those readers skilled in the art will understand the nature and function of the protocol layers shown in FIG. 2.

In a preferred embodiment of the invention a new protocol referred to here as the "ART Protocol" is implemented in the application layer 54. On the client side the ART protocol is represented by a client-side ART protocol stack 58 and on the server side the ART protocol is represented by a server-side ART protocol stack 60, both within the application layer 54. As is common is this art, software implementing a protocol is referred to as a "stack" and processes temporarily created by such software to handle communication with a particular remote host are referred to as "sockets". Typically stacks 58, 60 would be identical; each would create sockets for handling transmission of requests or replies to requests when called by an application, such as client application 50 and server application 52, that wishes to send requests or replies to requests to an application elsewhere in the computer network 10.

The transport layer 56 and lower protocol layers 61 are conventional in the embodiment shown in FIG. 2. For the purposes of the following discussion, the transport layer 56 is assumed to provide unreliable transport of messages sent to it by the application layer 54. However, it is further assumed that the transport layer 56 (or the lower layers 61; it does not matter to applications that are sending requests and replies over the computer network 10) provides error correction such that a message delivered to the transport layer 56 by the application layer 54 on the client side 13 will either be delivered uncorrupted by the transport layer 56 to the application layer 54 on the server side 15 or not delivered at all. Further, it is assumed that between at least some client/server pairs, messages may be lost due to the nature of the physical transmission method (e.g., wireless transmission), rather than due to collisions or buffer overflow due to congestion. Preferably, the transport layer 56 implements the User Datagram Protocol ("UDP"). In FIG. 2, the transport layer 56 is represented by a client-side protocol stack 57 and a server-side protocol stack 59, which are indicated by blocks in FIG. 2 in the area where block 13 overlaps block 56 and where block 15 overlaps block 56, respectively. While not preferred, Transmission Control Protocol ("TCP") may be used instead of UDP as the transport layer protocol 56. The client-side and server-side protocol stacks for the lower protocol layers 61 are indicated by blocks 63 and 64 in FIG. 2.

Figure 3:
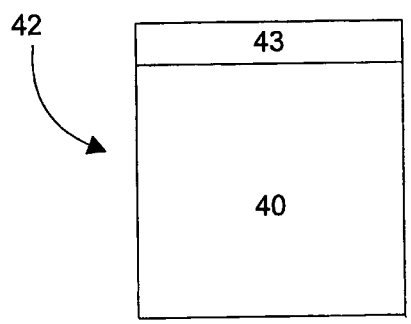
FIG. 3 is a schematic diagram of the structure of a datagram used in the network of FIG. 2.

Generally, as illustrated schematically in FIGS. 2 and 3, the client-side ART protocol stack 58 handles a request 40 received from the client-side application 50 by wrapping the request 40 into a request message 42 by adding an ART header 43 to the request 40 and sending the resulting request message 42 to the client-side transport layer protocol stack 57. Similarly, the server-side ART protocol stack 60 receives the request message 42 from the server-side transport layer protocol stack 59, strips away the ART header 43 and delivers the request 40 to the server-side application 52.

Figure 4:
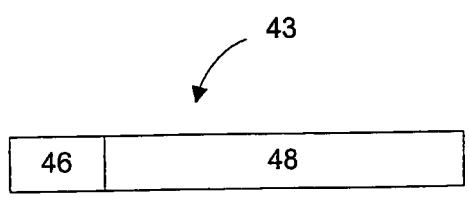
FIG. 4 is a schematic diagram of a header of a message constructed by an embodiment of the inventive method.

As shown in FIG. 4, the ART header 43 comprises a type code 46 and a segment number 48. In one implementation, the type code 46 comprises (1) a two bit binary number providing a message type and (2) a sequence number 48 that is a 14-bit number that distinguishes the message from other recent messages sent to the server application 52. In that implementation, messages may also be sent that do not have a payload (e.g., a provisional reply) as well as messages that do have a payload, whose type is either "request" or "reply".

The reliable transport provided by the ART protocol is illustrated generally by examples in FIGS. 5-15 showing the exchange of messages in eleven cases. In each case time proceeds downward and messages between the client-side ART protocol stack 58 and the server-side ART protocol stack 60 are shown as downward slanting arrows indicating that each message takes a finite time to reach its destination. Each drawing also shows timer intervals: on the client side, for a retransmission timer interval 70; and on the server side for a reply cache timer interval 74. In each diagram, the retransmission timer interval 70 is shown as running at most twice. If the client-side ART protocol stack 58 does not obtain a reply before the second expiry, an error message will be reported to the client application 50 and the socket will be closed. It should be noted that reporting an error after two expiries of the retransmission timer interval 70 would be unusual in practice, but is used here to eliminate unnecessary complexity in the drawings. The handling of error messages is outside the scope of the invention.

Figure 5:
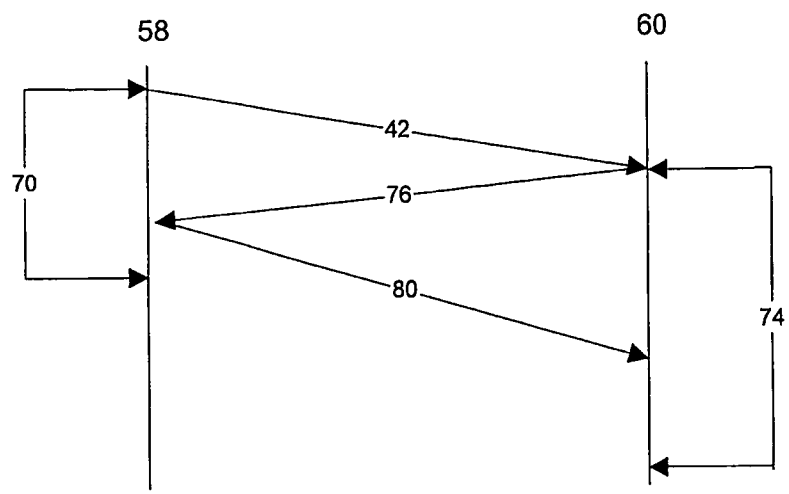
FIGS. 5-15 are schematic diagrams showing the timing of messages passing between the client side of a protocol stack that is an embodiment of the invention and the server side of a protocol stack that is an embodiment of the invention.

FIG. 5 schematically illustrates the timing and ordering of messages that occurs in the transmission of a request 40 from the client-side ART protocol stack 58 to the server-side ART protocol stack 60 in the ideal case in which there are neither losses of messages nor transmission or processing delays. Considering FIGS. 2, 3, and 4 together with FIG. 5, a request 40 received from the client application 50 by an ART socket created by the client-side ART protocol stack 58 is handled as follows:

(1) a request message 42 is formed having the request 40 as a payload and a header 43 that includes a type code 46 that indicates that the request message 42 contains the request 40 and a sequence number 48;
(2) a retransmission timer interval 70 is started; and
(3) the request message 42 handed over to the transport layer protocol stack 57 for transmission to the server-side ART protocol stack 60.

The request message 42 then proceeds through the communications network 22 and is received from the server-side transport layer protocol stack 59 by the server-side ART protocol stack 60. An ART socket created by the server-side ART protocol stack 60 handles the request message 42 as follows:

(4) the payload (the request 40 itself) in the request message 42 is delivered to the server application 52;

(5) when a reply is received from the server application process 52, a reply cache timer interval 74 is started;

(6) a reply message 76 is formed having the reply from the server application process 52 as a payload and a header 43 including a type code 46 that indicates that it contains a reply and a sequence number 48 that is the same as sequence number of the request message 42;

(7) a copy of the reply message 76 is stored in a reply cache by the server-side ART protocol stack 60; and (8) the reply message 76 is handed over to the server-side transport layer protocol stack 59 for transmission to the client-side ART protocol stack 58.

When the reply message 76 is received by the client-side ART protocol stack 58, then:

(9) the payload (the reply from the server application process 52) is delivered to the client application 50;

(10) an acknowledgement message 80 is formed with a header including a type code 46 indicating that it is an acknowledgement message and the sequence number of the request message 42; and

(11) the acknowledgement message 80 is handed over to the transport layer protocol stack 57 for transmission to the server-side ART protocol stack 60.

When the acknowledgement message 80 is received by the server-side ART protocol stack 60, then the cached reply message 76 in the reply cache is deleted and a record of the sequence number 48 is stored. When the reply cache timer interval 74 expires, the stored record of the sequence number 48 of the request message 42 is also deleted.

Figure 6:
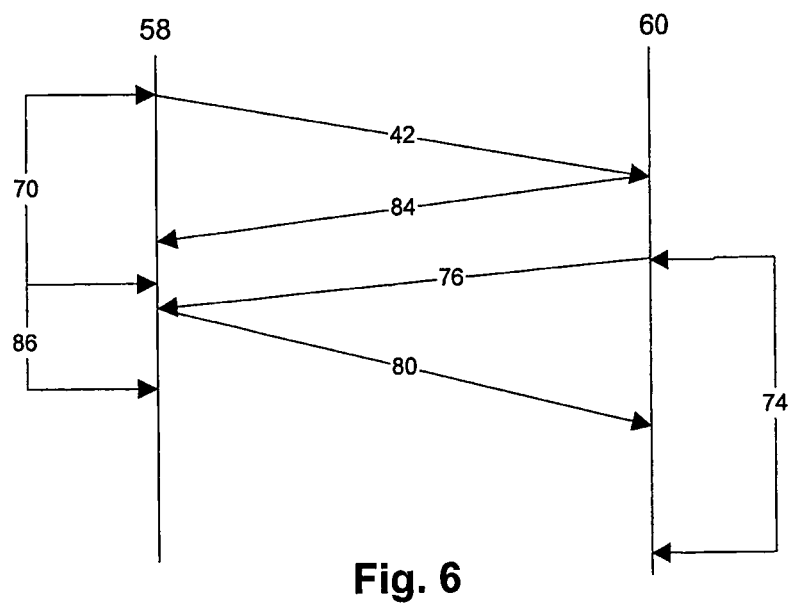
Figure 7:
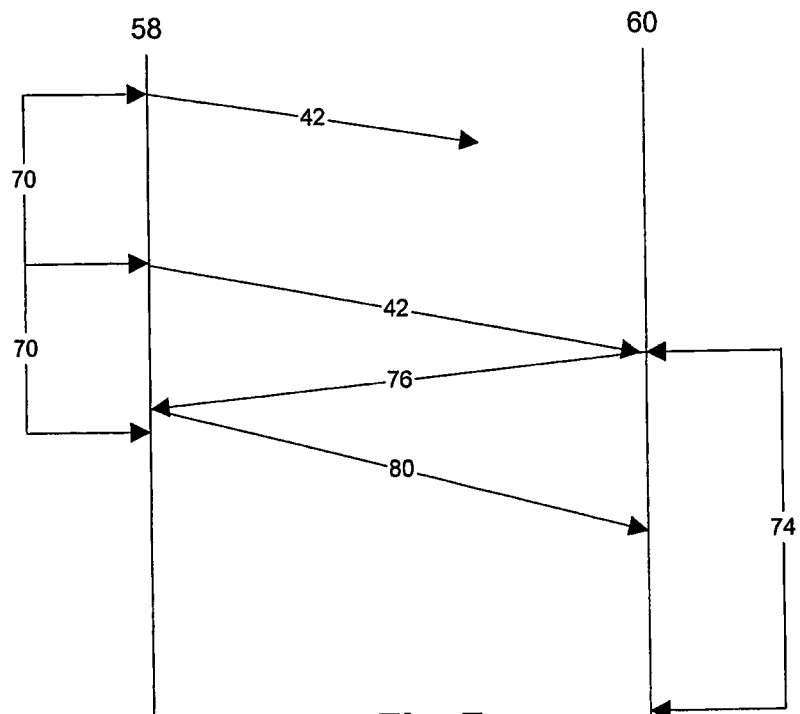
Figure 8:
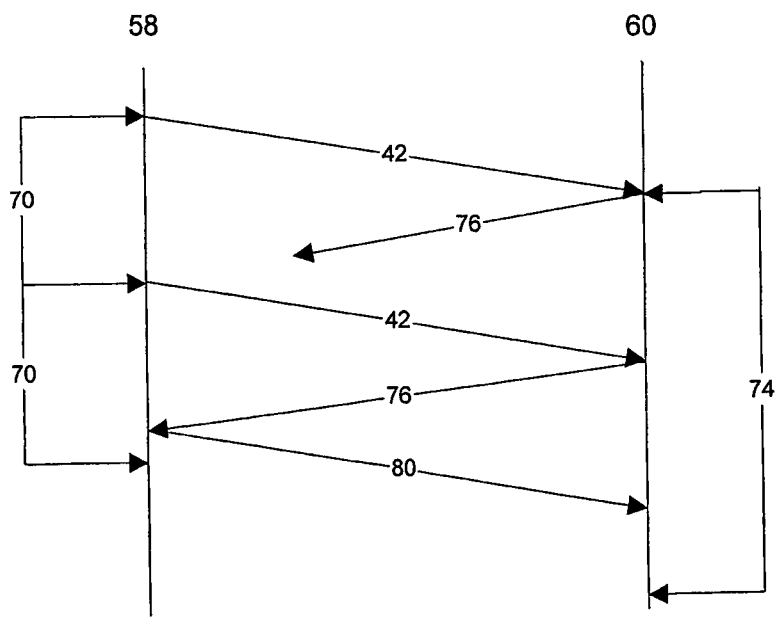
Figure 9:
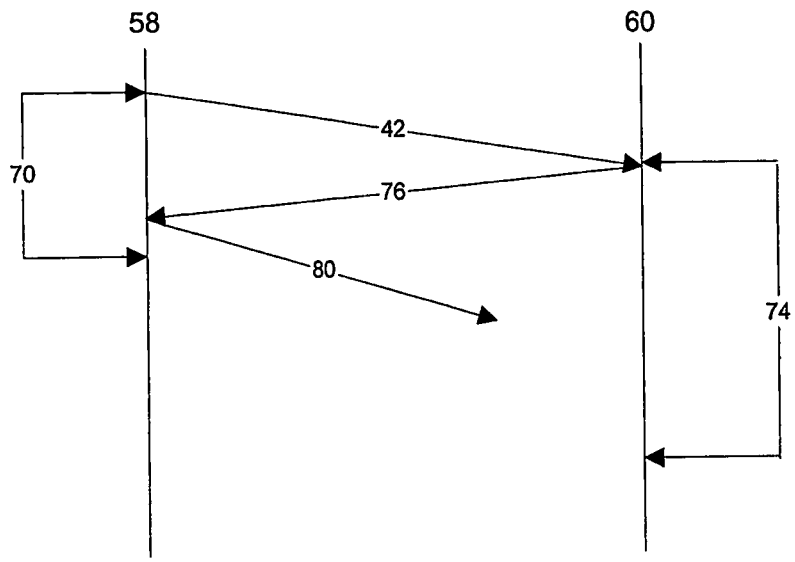

FIG. 6 schematically illustrates the timing and ordering of messages that occur in the transmission of a request 40 from the client-side ART protocol stack 58 to the server-side ART protocol stack 60 in the case in which there are no losses of messages, but either the request 40 is long so that it will not be provided in full to the server application 52 for some extended time or the server application 52 will require a long time to process the request 40 before providing a reply. Rather than waiting to send a reply message 76, the server-side ART protocol stack 60 sends a provisional reply 84, which as in the case of an acknowledgement message 80 may not contain a payload (unless in a particular implementation the payload is a delay interval) and a header 43 including a type code 46 indicating that it is an provisional reply message and the sequence number 48 of the request 40. The client-side ART protocol stack 58 upon receiving the provisional reply message 84, extends the retransmission timer interval 70 to delay its expiry by a delay interval 86 that could be either the payload of the provisional reply message 84 or a delay interval determined by the client-side ART protocol stack 58. Back at the server-side ART protocol stack 60, a reply is eventually provided by the server application 52 to the server-side ART protocol stack 60. The remainder of the sequence of events is the same is that discussed in relation to FIG. 5. Because the retransmission timer 70 was reset, the retransmission timer 70 did not expire before the reply message 76 was received. As a result, there was no needless retransmission of the request message 42.

Figure 10:
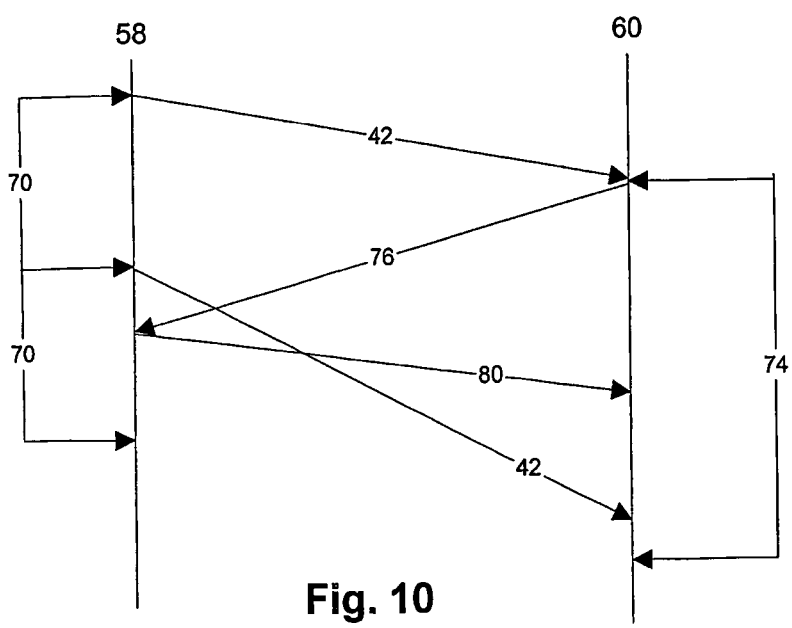
Figure 11:
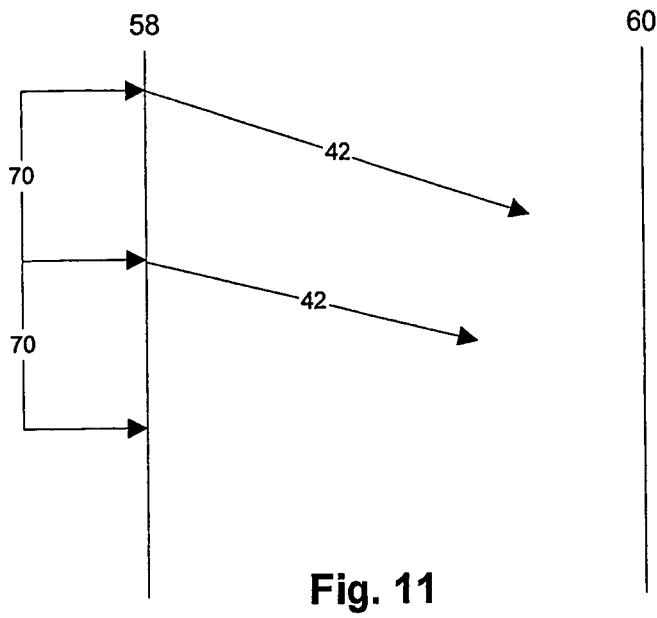
Figure 12:
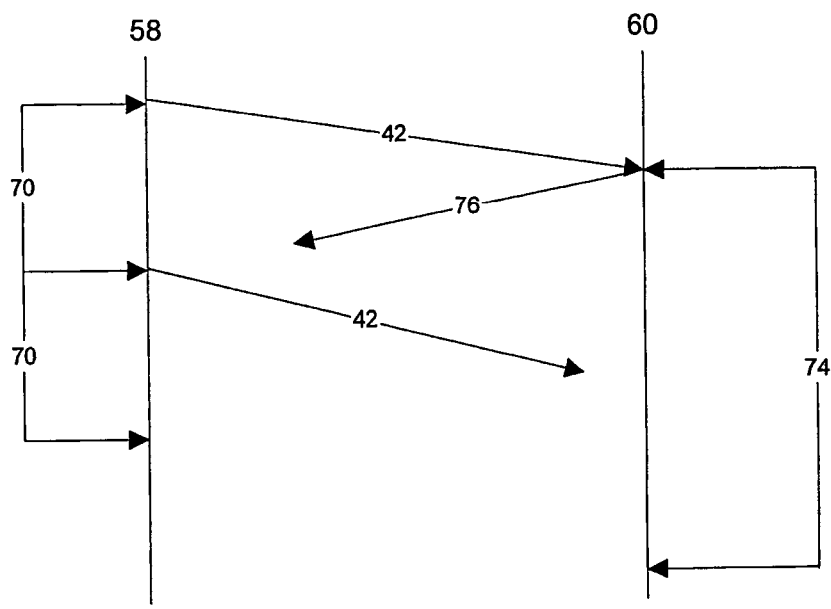
Figure 13:
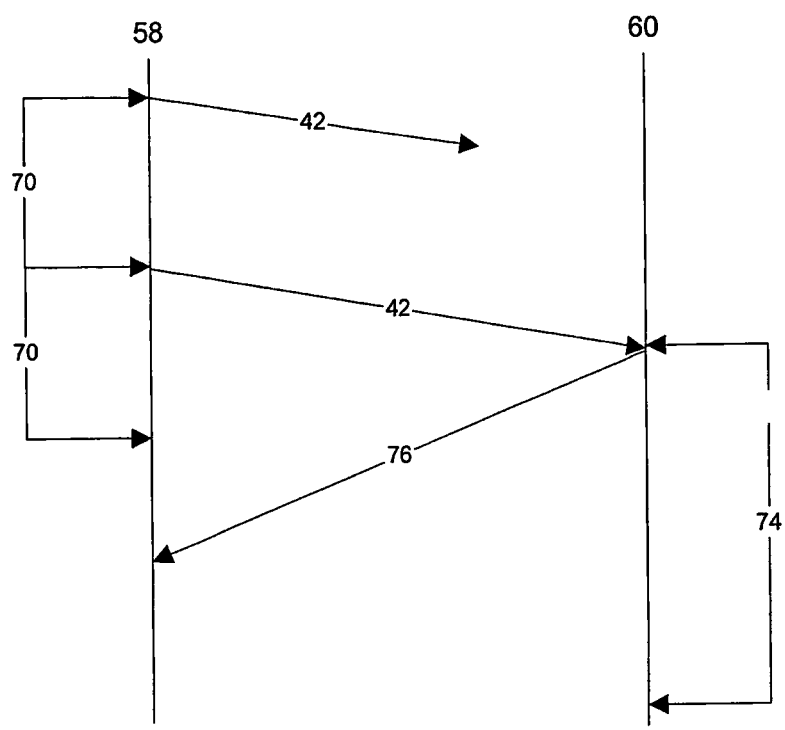
Figure 14:
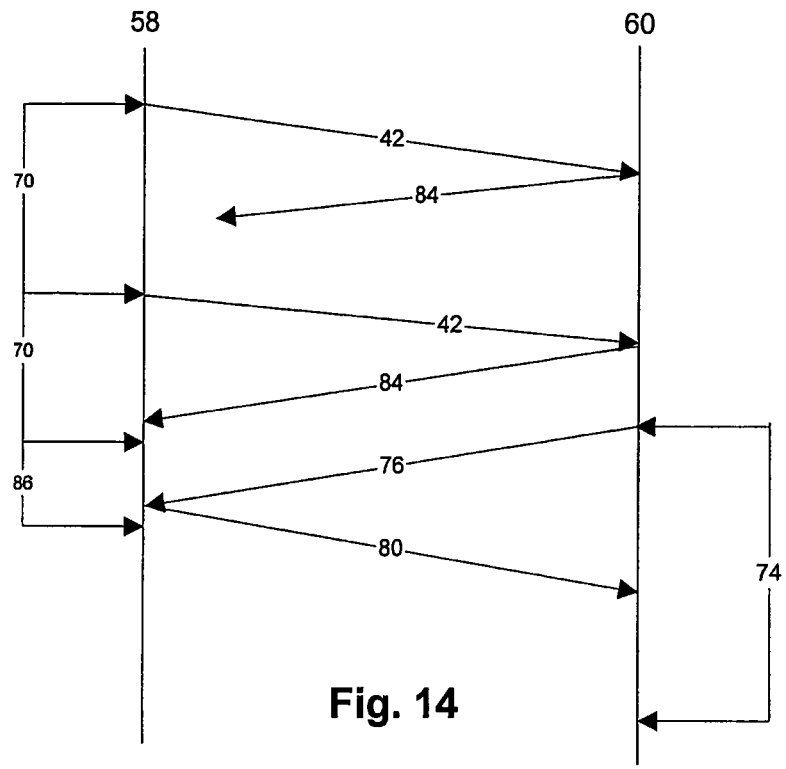
Figure 15:
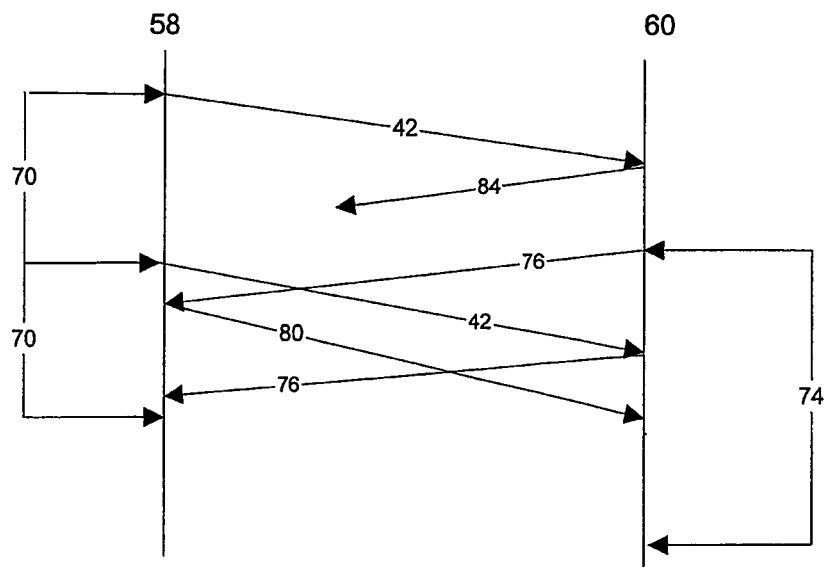

In the exchanges of messages illustrated in FIGS. 5 and 6, no messages were lost or delayed beyond their expected arrival times. FIGS. 7-15 illustrate how the ART protocol handles situations in which messages are lost or delayed. FIGS. 7-10 illustrate the exchange of messages when the request message 42 is lost the first time it is sent (FIG. 7), the reply message 76 is lost the first time it is sent (FIG. 8), the acknowledgement message 80 is lost (FIG. 9), and the reply message 76 is delayed and received after the retransmission timer expires for the first time (FIG. 10). FIGS. 11-13 illustrate situations in which reliable transport protocol ultimately fails and an error is reported upon the second expiry of the retransmission timer 70. FIGS. 14 and 15 illustrate two situations in which provisional replies 84 are lost and a second request 42 is sent. In both cases, the request 42 and reply 76 are reliably transported. It should be noted that in no case illustrated in FIGS. 5-15 has a request 42 been processed more than once by the server application 52. However, if an error is reported as in the cases illustrated in FIGS. 11-13, an error recovery procedure might result in a retransmission of the same request 42 with a new sequence number, which may be processed again. However, the flexibility provided by the use of personalities as discussed below can be used to minimize the use of an error recovery procedure unless the wireless link is totally closed down.

As will be apparent from the above discussion of FIGS. 5-15, the success and efficiency of a reliable transport mechanism depends upon an intelligent selection of the retransmission time-out intervals 70, the total number of retransmissions before an error is reported if no reply has been received, the delay interval 86 applied to the retransmission timer interval 70 if a provisional reply is received, and the reply cache timer interval 74. While each of these parameters could be fixed when an ART socket is created for a particular application using data passed to the ART protocol by the application, it is preferable for these parameters to be adjusted while an ART socket exists. For example, it may be best for some network applications to recalculate the retransmission timer interval 70 each time the retransmission timer interval 70 expires without a reply message 76 having been received. The recalculation may involve consideration of recent round-trip times between the client and the server. For other applications (or other processes of the same application), it may be best to keep the retransmission timer interval 70 constant. The inventor realized that the reliable transport mechanism could be made more flexible if the determination of these parameters were made by a set of functions called by the ART protocol stack, but which are supplied with the network application. An application programmer in writing or porting a network application could be provided with sets of functions suitable for a number of types of network application processes. The application programmer would not have to deal with the nuts and bolts of providing reliable transport, but would simply (1) link a network application with a selected set of functions when creating an executable of the application, (2) include code in the application to pass a structure containing pointers to the functions of the selected set to the ART protocol stack, and (3) include in the application calls to the ART protocol stack. Since each set of functions provides different behavior on the part of the reliable transport mechanism, a particular set of such functions is referred here as a "personality" and the functions of a personality as "personality functions".

In addition to providing flexible and easy selection of timer parameters, the use of personalities can allow the structure of messages sent and received by an ART protocol stack to be changed by changing the personality. In particular, if a personality provides message creating and parsing functions for use by the ART protocol stack, then the structure of the ART header could be different for different personalities, without changing the application or the ART protocol stack. For example, a personality could provide a header that includes space for 32-bit sequence number. Further, by providing appropriate message creating and parsing personality functions a personality could re-encode or supplement data contained in request or reply so that the client-side of one network application could communicate with the server-side of a different network application even though the two network applications use incompatible data encoding and message structures.

More specifically, the following are the calls that a client application 50 can make to the client-side ART stack 58 in a present embodiment of the invention:

ART_open, to open a client ART socket;

ART_set_tos, to set the Type of Service (ToS) for the underlying IP protocol;

ART_connect, to connect the client ART socket to a server ART socket;

ART_request_reply, in synchronous operation, to form and send a request message 42 including the request 40 provided by the client application 50, wait for a reply message 76, and return the reply to the client application 50;

ART_send_request, in asynchronous operation, to form and send a request message 42 using the request 40 provided by the client application 50 and return the sequence number 48 of the request message 42 to the client application 50 without waiting for a corresponding reply message;

ART_recv_reply, in asynchronous operation, to wait for a reply message 42 to the request message 40 having a specific sequence number 48 or any request message and return the reply to the client application 50; and ART_close, to close the client ART socket.

The following are the calls that a server application 52 can make to the server-side ART stack 60 in the present embodiment of the invention:

ART_open, to open an server ART socket;

ART_set_tos, to set the Type of Service (ToS) for the underlying IP protocol;

ART_recv_request, to wait for a request message and return the request to the calling server application 52;

ART_send_provisional, to send a provisional reply message;

ART_send_reply, to send a reply message and cache the reply message; and

ART_close, to close a server ART socket.

A call to open an ART socket (ART_open) must include a structure that contains the pointers to the personality functions. The following are the personality functions that are called by the client-side ART protocol stack 58:

open( ), a function that creates data structures needed for a new socket, returns a starting sequence number, a minimum and maximum sequence number, header and trailer sizes, and the number of retransmissions of a request before an error is reported;

connect( ), a function that sets up the connection to the server ART socket created by the server-side ART protocol stack 60, including, if necessary, handshaking;

wrap_request( ), a function to form a request message 42 by adding a header 43 to a request 40 provided by the client application 50;

retransmit_timer( ), a function that returns a retransmission timer interval 70 for the i-th retransmission when called by the client-side ART stack 58 upon sending a request message 42 to the transport layer 56 and when the retransmission timer interval 70 before a reply message is received;

parse( ), a function to parse a message received by the client-side ART stack 58 to extract the sequence number 48 and type code 46 of message from an ART header 43, extract any payload in the message, and if the type indicates that the message is a provisional reply, then change the retransmission timer interval 70 to delay its expiration;

rtd_update( ), a function that is called when a reply message is received by client-side ART stack 58 to update with the round trip time any data kept by the personality functions for use in determining timer settings;

ack_reply( ), a function to send an acknowledgement when a reply message has been received and returned to the client process; and close( ), a function that destroys any data structures created for a specified ART socket.

The following are the personality functions that are called by the server-side ART protocol stack 60:

open( ), to create data structures needed for a new socket;

parse( ), to parse a message received by the server-side ART protocol stack 60 to extract the sequence number and type of message from the header, and extract any payload in the message;

wrap_reply( ), to form a reply message by adding a header to a reply provided by the server application or to form a provisional reply message;

reply_cache_timer( ), that returns a cache timer interval 74 when called by the server-side ART stack upon receipt of a request message from the transport layer; and close( ), to destroy any data structures created for a specified socket.

ART protocol stacks also include the following utility functions ("personality utility functions") that may be called by the personality functions:

ART_get_priv( ), to get a private personality state data maintained for a particular socket;

ART_timer_request( ), to maintain a private timer for a personality;

ART_timer_cancel( ), to cancel a private timer kept by a personality;

ART_csend( ), to send a message to a client-side ART stack in situations in which a message needs to be sent without receiving a call to do so from the server application;

ART_ssend( ), to send a message to a server-side ART stack in situations in which a message needs to be sent without receiving a call to do so from the client application;

ART_defer_retransmission( ), to modify the retransmission interval 70 when the parse function has determined that a provisional reply has been received; and ART_reply_cache_clear( ), to clear the payload of a cached reply message when the parse function has determined that an acknowledgement has been received.

As well as being embodied in a method for providing reliable transport, the invention may be embodied in the host computers in a computer network such as computer network 10 illustrated in FIG. 1. In such an embodiment, the operating system 20 of the client host computer 12 includes a client-side ART protocol stack 58 for use by client applications and the operating system 30 of the server host computer 14 includes a server-side ART protocol stack 60 for use by server applications.

The following describes in more detail the actions taken by the client-side ART protocol stack 58 and the server-side ART protocol stack 60 in a current embodiment in reliably transporting a request from a client application to a server application.

Client-Side ART Protocol Stack

When a command is received from a client application to open a client socket:
  call the open personality function to have the personality allocate any per-connection storage it may need to keep data.

When a command is received from the client application to connect the client socket to a server application:
  call the connect personality function to obtain an initial sequence number, a range of allowable sequence numbers, a maximum number of retransmissions, and header and trailer sizes, and to allocate resources to needed to support the client socket.

When a command is received from the client application to transmit a request to the server application:
  determine the next sequence number;
  call the wrap request personality function to wrap the request in a request message having a header containing the sequence number and a message type code indicating that the request message contains a request;
  call the retransmit timer personality function to obtain a retransmit timer duration for setting the retransmit timer for the request;
  start the retransmit timer;
  send the request message to the transport layer for transmission to the server application; and
  if the command to transmit the request did not block inside the ART stack until a reply was received or all retransmit times expired, then return the sequence number to the client application.

When a message is received from the transport layer:
  call the parse personality function to obtain the message type, sequence number of the message, and the payload, if any, and if the message type and sequence number indicates that the message is a provisional reply to the request, to modify the retransmit timer to delay its expiration;
  if the message type returned by the parse personality function indicates that the message contained a reply as a payload, then
    if the sequence number returned matches an outstanding request, then
      if the command to transmit the request specified that the reply be returned to the client application upon its receipt from the transport layer, or the client application, since sending the command to transmit the request, has sent a command to return the reply upon its receipt from the transport layer, then return the reply to the client application, but otherwise store the reply.

When a command is received from the client application to return a reply that is received to the request and the reply has been received and stored:
  return the reply to the client application.
  After the reply is returned to the client application:
  call the acknowledgement reply personality function, which may send a message to the transport layer for transmission to the server application acknowledging the return of the reply to the client application, the message containing the sequence number and an indication that the message is an acknowledgement to the reply message.

If no message having a header containing the sequence number and a type code indicating that the message contains a reply has been received before the retransmit timer has expired, then repeatedly:
  call the retransmit timer personality function to obtain a new retransmit timer setting for setting the retransmit timer;
  set and start the retransmit timer; and
  send the request message to the transport layer for transmission to the server application,
    until the retransmit timer has expired the maximum number of times or until a message having a header containing the sequence number and a type code indicating that the message contains a reply is received from the transport layer,
  but if the retransmit timer has expired the maximum number of times and no such message has been received, then:
    report a transmission error to the client application and destroying any subsequent messages having a header containing the sequence number until the sequence number is assigned to a new request message.

When a command is received from the client application to close the client socket,
  call the close personality function to free up any resources allocated to support the client socket.

Server-Side ART Protocol Stack

When a command is received from the server application to open a server socket:
  call the open personality function to allocate resources needed to support the server socket.

When a message is received from the client application:
  call the parse personality function to obtain the message type, the sequence number of the message, and the request, if the message type indicates that the message contained a request, and then
  if a request is returned by the parse personality function, return the request to the server application if a command was previously received from the server application to receive a request from the client application, but otherwise store the request for future retrieval by the server application.

If, after delivery of the request to the server application, a command is received from the server application to send a provisional reply, then:
  call the wrap personality function to form a provisional reply message having a sequence number and a message type code indicating that the message is a provisional reply to the request message, and then
  send the provisional reply message to the transport layer for transmission to the client application.

When a command is received from the server application to transmit a reply to the client application:
  call the wrap reply personality function to wrap the reply in a header containing the sequence number and a message type code indicating that the request message contains a reply,
  call the reply cache timer personality function to obtain a reply cache timer interval for setting a reply cache timer that counts down from the setting, start the reply cache timer,
  send the resulting message to the transport layer for transmission to the client application, and
  cache a copy of the reply message.

When a message is received from the client application subsequent to the first message containing the request:
  call the parse personality function to
    obtain the message type and sequence number of the message, and
    to delete the payload from the cached reply message if the message contains an indication that the message is an acknowledgement to a cached reply message; and if the message type indicates that the message contains a request and a cached reply message has the same sequence number, then
resend the cached reply message to the transport layer for transmission to the client application.

When the reply cache timer interval expires:
delete the cached reply message.

When a command is received from the server application to close the server socket:
call the close personality function to free up any resources allocated by the personality functions.

The above-described embodiments of the invention is intended to be examples of the present invention, and alterations and modifications may be effected thereto by those of skill in the art, without departing from the scope of the invention which is defined solely by the claims appended hereto.

The invention claimed is:

1. A method for reliably transmitting over a computer network requests, from client applications running on a client computer to server-applications running on a server computer, the client computer having a central processing unit, memory, a client-side application protocol stack, a plurality of client-side functions to perform reliable transport-related tasks for a plurality of applications, including a function that returns a starting sequence number and range of allowable sequence numbers for request messages, and a client-side transport protocol stack, the method comprising:
the client-side application protocol stack
receiving an indication from a client application of a selected set of one or more of the plurality of client-side functions for use by the client-side application protocol stack, with a request from the client application, to perform reliable transport-related tasks,
receiving for transmission the request from the client application,
wrapping the request in a request message, wherein wrapping the request comprises adding a header to the request, the header including an identifying sequence number assigned by the client-side application protocol stack and a type code identifying the type of the request message as a request,
calling, based upon the indication received from the client application, the selected set of one or more of the plurality of client-side functions to obtain one or more parameters associated with reliability of the transmission,
utilizing the one or more parameters to provide aspects of the reliability of the transmission of the request, and sending the resulting request message to the client-side transport protocol stack;
the client-side transport protocol stack receiving the request message and transmitting it to a server-side transport protocol stack;
the client-side application protocol stack retransmitting the request message if a message is not received from the server-side transport protocol stack which contains the sequence number of the request message and a type code that indicates before the time-out period for i-th transmission has elapsed since the request message was transmitted for the i-th time and the number of times that the request message has been transmitted is less than a total allowed number of transmissions; and
wherein if a message received by the client-side application protocol stack from the server-side transport protocol stack contains the sequence number of the request message and a type code that indicates that it is a provisional reply message to the request message, then the current time-out period for retransmission is modified to delay its expiration.

2. The method of claim 1, wherein the one or more parameters comprises a time out period and the plurality of client-side functions includes a function for using the time-out period to determine a time-out for an i-th transmission of the request message.

3. The method of claim 1, wherein the one or more parameters comprises a total allowed number of transmissions of the request message to be made and the plurality of client-side functions includes a function for using that parameter to determine if the allowed number of transmissions has been reached and reporting an error.

4. The method of claim 1, wherein the one or more parameters comprises a time-out period for a reply cache timer and wherein the plurality of client side function comprises a function for determining the time-out period for the reply cache timer based on the at least one parameter.

5. The method of claim 4, further comprising the client-side application protocol stack calling one of the selected set of one or more of the plurality of client-side functions plurality of client-side functions and the called function determining a time-out period for an i-th transmission of the request message and a total allowed number of transmissions of the request message to be made before an error is reported.

6. The method of claim 4, further comprising the client-side application protocol stack calling one of the selected set of one or more of the plurality of client-side functions and the called function providing a starting sequence number and range of allowable sequence numbers for request messages.

7. The method of claim 6, further comprising the client-side application protocol stack calling one of the selected set of one or more of the plurality of client-side functions and the called function determining a time-out period for an i-th transmission of the request message and a total allowed number of transmissions of the request message to be made before an error is reported.

8. The method of claim 1, wherein wrapping the request in a request message includes calling one of the plurality of client-side functions, the called function wrapping the request in the request message and the function for wrapping the request was identified by the client application.

9. The method of claim 1, further comprising the client-side application protocol stack calling one of the selected set of one or more of the plurality of client-side functions and the called function parsing a message received from the server-side application protocol stack and that returns the type and sequence number of that message to the client-side application protocol stack.

10. The method of claim 1 wherein the server computer has a central processing unit, memory, a server-side application protocol stack, a plurality of server-side functions and the server-side transport protocol stack the method further comprising:
the server-side application protocol stack
receiving one or more indications from the server application indicating one or more of the plurality of server-side functions to perform reliable transport-related tasks,
receiving the request message from the client application via the sever-side transport protocol stack,
unwrapping the request message and providing the resulting request to the server-side application,
calling the one or more of the plurality of server-side functions, indicated by the indications received from the server application, to obtain one or more parameters associated with a reply message to be sent from the server-side application protocol stack to the client-side computer, utilizing the one or more parameters to provide aspects of the reliability of the transmission of the reply, generating the reply; and the server-side transport protocol stack receiving the reply from the server-side application protocol stack and transmitting it to the client-side transport protocol stack.

11. The method of claim 10, further comprising the server-side application protocol stack calling one of the plurality of server-side functions indicated by the server-side application and the called function determining a time-out period for a reply cache timer.

12. The method of claim 11 further comprising the server-side application protocol stack calling one of the plurality of server-side functions indicated by the server-side application and the called function parses the request message received from the client-side application protocol stack and returns a type and a sequence number of that request message.

13. The method of claim 12, wherein, if the message type of a request message received from the client-side application protocol stack indicates that the request message contains a request, delivering the request to the server application.

14. The method of claim 13, wherein, if, after delivery of the request to the server-side application, the server-side application wishes to send a provisional reply, then sending a message to the client-side application protocol stack containing the sequence number and a message type code indicating that the message is a provisional reply to the request message.

15. The method of claim 14, wherein, if the message type of a message received from the client protocol stack indicates that the message is an acknowledgement to a cached reply message, then retaining only the sequence number in the cached reply message in the reply cache.

16. The method of claim 12, wherein, when a reply message is sent to the client-side application protocol stack, starting the reply cache timer, caching the reply message in a reply cache, and destroying the cached reply message upon the expiration of the time-out period.

17. The method of claim 16, wherein when the reply cache timer expires, deleting the cached reply message.

18. The method of claim 13, wherein, if the message type of a message received from the client-side application protocol stack indicates that the message contains a request and a cached reply message has the same sequence number, then resending the cached reply message to the client protocol stack.

19. The method of claim 10, further comprising the server-side application protocol stack calling one of the plurality of server-side functions indicated by the server-side application and the called function wraps the reply in a reply message.

20. The method of claim 10, wherein wrapping the reply in a reply message further includes adding a header to the reply message that includes the identifying sequence number assigned by a client-side application protocol stack to the corresponding request message and a type code identifying the type of the reply message as a reply.

21. The method of claim 10 further comprising the server application indicating to the server-side application protocol stack a group of the plurality of server-side functions to be used in connection with the transmission of communications for the server application.

22. The method of claim 21 wherein the indicated group of the plurality of server-side functions is different for different server applications.

23. The method of claim 1 further comprising
the client application indicating to the client-side application protocol stack a group of the plurality of client-side functions to be used in connection with the transmission of requests for the client application.

24. The method of claim 23 wherein the indicated group of the plurality of client-side functions is different for different client applications.

25. A system for reliably transmitting over a computer network requests, from client applications to server applications, the system comprising:

a client computer having a central processing unit and a memory;

a plurality of client-side functions on the client computer to perform reliable transport-related tasks for client applications, including a function that returns a starting sequence number and range of allowable sequence numbers for request messages;

a client application on the client computer and configured to create a request to a server application running on a server computer and to identify one or more of the plurality of client-side functions to be used with the client application to perform reliable transport-related tasks for the client application;

a client-side transport protocol stack on the client computer which receives request messages and transmits them to a server-side transport protocol stack; and a client-side application protocol stack on the client computer which receives from the client application the identification of one or more of the plurality of client-side functions to be used with the client application to perform reliable transport-related tasks for the client application and receives for transmission a request from the client application, wraps the request in a request message, wherein wrapping the request comprises adding a header to the request, the header including an identifying sequence number assigned by the client-side application protocol stack and a type code identifying the type of the request message as a request, calls the identified one or more of the plurality of client-side functions to obtain one or more parameters associated with reliability of the transmission, utilizes the one or more parameters to provide aspects of the reliability of the transmission of the request, and sends the resulting request message to the client-side transport protocol stack;

wherein the client-side application protocol stack retransmits the request message if a message is not received from a server-side transport protocol stack which contains the sequence number of the request message and a type code that indicates before the time-out period for i-th transmission has elapsed since the request message was transmitted for the i-th time and the number of times that the request message has been transmitted is less than a total allowed number of transmissions; and wherein if a message received by the client-side application protocol stack from the server-side transport protocol stack contains the sequence number of the request message and a type code that indicates that it is a provisional reply message to the request message, then the current time-out period for retransmission is modified to delay its expiration.

26. The system of claim 25, wherein the plurality of client-side functions includes a function for determining a time-out period for an i-th transmission of the request message based upon the one or more parameters.

27. The system of claim 25, wherein the plurality of client-side functions includes a function for determining a total allowed number of transmissions of the request message to be made before an error is reported based upon the one or more parameters.

28. The system of claim 25, wherein the plurality of client-side functions includes a function for determining the time-out period for the reply cache timer based upon the one or more parameters.

29. The system of claim 28, further comprising a client-side function which provides a starting sequence number and range of allowable sequence numbers for request messages.

30. The system of claim 25, wherein the client-side application protocol wraps the request in a request message by calling one of the plurality of client-side functions and the called function wraps the request in the request message.

31. The system of claim 25, further comprising a client-side function which determines a time-out period for an i-th transmission of the request message and a total allowed number of transmissions of the request message to be made before an error is reported.

32. The system of claim 25, further comprising a client-side function which parses a message received from a server-side application protocol stack and returns the type and sequence number of that message to the client-side application protocol stack.

33. The system of claim 25 further comprising:
a server computer having a central processing unit and a memory;
one or more server-side functions on the server computer to perform reliable transport-related tasks for server applications;
a server application on the server computer and configured to identify one or more of the of server-side functions for use with the server application and to create a reply to a client request from a client application running on a client computer;
the server-side transport protocol stack which transmits reply messages to a client-side application protocol stack and receives request messages from a client application; and
a server-side application protocol stack which
receives the identification of one or more of the server-side functions from the server applications,
receives a request message from the server application via the server-side transport protocol stack,
unwraps the request message and provides the resulting request to the server-side application,
calls the identified one or more of the server-side functions to obtain one or more parameters associated with a reply message to be sent from the server-side application protocol stack to the client computer,
utilizing the one or more parameters to provide aspects of the reliability of the transmission of the reply, and generating the reply.

34. The system of claim 33, wherein the one or more server-side functions comprises a function which, when called by the server-side application protocol stack, determines a time-out period for a reply cache timer.

35. The system of claim 34, wherein the one or more server-side functions comprises a function which, when called by the server-side application protocol stack, wraps the reply in a reply message.

36. The system of claim 35, wherein wrapping the reply in a reply message further includes adding a header to the reply message that includes the identifying sequence number assigned by a client-side application protocol stack to the corresponding request message and a type code identifying the type of the reply message as a reply.

37. The system of claim 36, wherein the one or more server-side functions comprises a function which, when called by the server-side application protocol stack, parses the request message received from the client-side application protocol stack and returns a type and a sequence number of that request message.

38. The system of claim 37, wherein, the server-side application protocol stack delivers the request message to the server application if the message type of the request message received from a client-side application protocol stack indicates that the request message contains a request.

39. The system of claim 38, wherein, if, after delivery of the request to the server-side application, the server-side application wishes to send a provisional reply, then sending a message to the client-side application protocol stack containing the sequence number and a message type code indicating that the message is a provisional reply to the request message.

40. The system of claim 39, wherein, when a reply message is sent to the client-side application protocol stack, the server-side application protocol stack starts the reply cache timer, caches the reply message in a reply cache, and destroys the cached reply message upon the expiration of the time-out period.

41. The system of claim 40, wherein, if the message type of a message received from the client-side application protocol stack indicates that the message contains a request and a cached reply message has the same sequence number, then the server-side application protocol stack resends the cached reply message to the client protocol stack.

42. The system of claim 41, wherein, if the message type of a message received from the client protocol stack indicates that the message is an acknowledgement to a cached reply message, then the server-side application protocol stack retains only the sequence number in the cached reply message in the reply cache.

43. A method for reliably transmitting over a computer network requests, from client applications running on a client computer to server applications running on a server computer based upon parameters indicated by the client applications, the client computer having a central processing unit, memory, a client-side application protocol stack, a plurality of client-side functions to perform reliable transport-related tasks, including a function that returns a starting sequence number and range of allowable sequence numbers for request messages, and a client-side transport protocol stack, the server computer having a central processing unit, memory, a server-side application protocol stack, a plurality of server-side functions and a server-side transport protocol stack, the method comprising:
the client-side application protocol stack
receiving from a client application an indication of a selected set of one or more of the plurality of client-side functions for use with a request from the client application to perform reliable transport-related tasks,
receiving for transmission the request from the client application,
wrapping the request in a request message, including adding a header to the request, the header including an identifying sequence number assigned by the client-side application protocol stack and a type code identifying the type of the request message as a request, selecting and calling, based upon the indication from the client application, the selected set of one or more of the plurality of client-side functions to obtain at least one parameter for governing one or more aspects of reliability of the transmission, utilizing the at least one parameter to provide aspects of the reliability of the transmission of the request, and sending the resulting request message to the client-side transport protocol stack;

the client-side transport protocol stack receiving the request message and transmitting it to the server-side transport protocol stack;

the server-side transport protocol stack receiving the request message from the client-side transport protocol stack and sending received request message to the server-side application protocol stack;

the server-side application protocol stack unwraps the request from the request message and sends the request to the server application;

wherein the client-side application protocol stack retransmits the request message if a message is not received from the server-side transport protocol stack which contains the sequence number of the request message and a type code that indicates before the time-out period for i-th transmission has elapsed since the request message was transmitted for the i-th time and the number of times that the request message has been transmitted is less than a total allowed number of transmissions; and wherein if a message received by the client-side application protocol stack from the server-side application protocol stack contains the sequence number of the request message and a type code that indicates that it is a provisional reply message to the request message, then the current time-out period for retransmission is modified to delay its expiration.

44. The method of claim 43, wherein the at least one parameter comprises a time-out period for an i-th transmission of the request message to be made before an error is reported, and wherein the at least one client side function comprises a function for determining the time-out period for the i-th transmission of the request message based on the at least one parameter.

45. The method of claim 43, wherein the at least one parameter comprises a total allowed number of transmissions of the request message to be made before an error is reported, and wherein the at least one client side function comprises a function for determining the total allowed number of transmissions of the request message base on the at least one parameter.

46. The method of claim 43, wherein the at least one parameter comprises a time-out period for a reply cache timer, and wherein the at least one client side function comprises a function for determining the time-out period for the reply cache timer based on the at least one parameter.

47. The method of claim 43 further comprising
the client-side application protocol stack
receiving from a second client application an indication of a second selected set of one or more of the plurality of client-side functions for use with a request from the second client application to perform reliable transport-related tasks, receiving for transmission the request from the client application, wrapping the request in a request message, selecting and calling, based upon the indication from the second client application, the second selected set of one or more of the plurality of client-side functions to obtain at least one parameter for governing one or more aspects of reliability of the transmission, utilizing the at least one parameter to provide aspects of the reliability of the transmission of the request, and sending the resulting request message to the client-side transport protocol stack.

48. The method of claim 43, wherein the plurality of functions includes a function that parses a message and returns the type and sequence number of that message and if the message includes a payload, the payload.

49. The method of claim 48, wherein, if the message type of a message received from the client-side application protocol stack indicates that the message contains a request, delivering the request to the server application.

50. The method of claim 49, wherein, if, after delivery of the request to the server application, the server application wishes to send a provisional reply, then the server-side application protocol stack sending a message to the client-side application protocol stack containing the sequence number and a message type code indicating that the message is a provisional reply to the request message.

51. The method of claim 50, wherein
when a reply message is sent by the server-side application protocol stack to the client-side application protocol stack, starting a reply cache timer, caching the reply message in a reply cache, and destroying the cached reply message upon the expiration of a reply cache time-out period;

if the message type of a message received by the server-side application protocol stack from the client-side application protocol stack indicates that the message contains a request and a cached reply message has the same sequence number, then resending the cached reply message to the client-side application protocol stack; and if the message type of a message received by the server-side application protocol stack from the client-side application protocol stack indicates that the message is an acknowledgement to a cached reply message, then retaining only the sequence number in the cached reply message in the reply cache, and when the reply cache timer expires, deleting the cached reply message.

52. The method of claim 43 further comprising
the client application indicating to the client-side application protocol stack a group of the plurality of client-side functions to be used in connection with the transmission of requests for the client application.

53. The method of claim 52 wherein the indicated group of the plurality of client-side functions is different for different client applications.

* * * * *